United States Patent
Pathak et al.

(10) Patent No.: US 9,540,829 B2
(45) Date of Patent: Jan. 10, 2017

(54) MAINTENANCE ASSEMBLY ADAPTABLE WITHIN GAS TURBINE ENGINE

(71) Applicant: ALSTOM Technology Ltd, Baden (CH)

(72) Inventors: Gaurav Pathak, Ennetbaden (CH); Christopher Michael Robson, Ennetbaden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 14/335,100

(22) Filed: Jul. 18, 2014

(65) Prior Publication Data

US 2015/0027811 A1    Jan. 29, 2015

(30) Foreign Application Priority Data

Jul. 23, 2013 (EP) .................................... 13177623

(51) Int. Cl.
*E04G 3/24* (2006.01)
*B66F 3/35* (2006.01)
(Continued)

(52) U.S. Cl.
CPC . *E04G 3/24* (2013.01); *B66F 3/35* (2013.01); *E04G 3/246* (2013.01); *F01D 25/285* (2013.01);
(Continued)

(58) Field of Classification Search
CPC ............ E04G 3/24; E04G 3/243; E04G 3/246; E04G 11/20; E04G 11/36; E04G 15/063; E04G 15/065; E04G 15/066; E04G 15/068; E04G 21/1866; E04G 21/1875; E04G 3/00; E04G 3/305; E04G 2003/28; F01D 25/00; F01D 25/285; B66F 3/35; B66F 3/40; F02C 7/00
See application file for complete search history.

(56) References Cited

U.S. PATENT DOCUMENTS 2,361,832 A * 10/1944 Eyles ........................ B64F 1/22
                                                        254/93 R
2,609,177 A *  9/1952 Hughes .................... B66F 3/35
                                                        254/93 HP
(Continued)

FOREIGN PATENT DOCUMENTS

| CN | 1915784 A | 2/2007 | |
| EP | 2 527 605 A1 | 11/2012 | |
| JP | 02221555 A * | 9/1990 | ............... E04G 3/24 |

OTHER PUBLICATIONS

First Office Action issued Sep. 25, 2015 by the Chinese Patent Office in corresponding Chinese Patent Application No. 201410351732.5, and an English translation tthereof (13 pages).

*Primary Examiner* — Daniel Cahn
(74) *Attorney, Agent, or Firm* — Buchanan Ingersoll & Rooney PC

(57) ABSTRACT

The maintenance assembly, for workers to perform maintenance activities within a gas turbine engine, is capable of being arranged within a cavity, generally around a combustor, accessible from a manhole of the gas turbine engine. The maintenance assembly includes a platform, and an inflatable member cooperatively configured to the platform. The inflatable member is at a normal condition, when placed outside of the cavity, being at a deflated position and is at a working condition, when arranged within the cavity, being at inflated position so as to accommodate a shape coordinating the cavity in such a manner that the platform is advance within the cavity up to a predetermined level to enable the workers on the platform to reach at a predetermined position within the cavity to perform the maintenance activities.

10 Claims, 2 Drawing Sheets

(51) Int. Cl.
*F01D 25/28* (2006.01)
*F02C 7/00* (2006.01)
(52) U.S. Cl.
CPC ............. *F02C 7/00* (2013.01); *F05D 2230/68* (2013.01); *F05D 2230/72* (2013.01)

(56) References Cited

U.S. PATENT DOCUMENTS

| | | | | |
|---|---|---|---|---|
| 2,714,011 A * | 7/1955 | Albee | ............... | B60B 9/20 152/9 |
| 3,279,192 A | 10/1966 | Hull, Jr. et al. | | |
| 3,323,307 A * | 6/1967 | Hardy | ............... | F01D 25/285 60/226.1 |
| 3,799,504 A * | 3/1974 | Vaughen | ............... | F15B 15/10 254/93 HP |
| 3,840,922 A * | 10/1974 | Morrison | ............... | A63B 6/02 182/137 |
| 3,948,344 A * | 4/1976 | Johnson | ............... | B65D 19/00 180/124 |
| 4,061,310 A * | 12/1977 | Vetter | ............... | B66F 3/35 254/93 HP |
| 4,199,301 A | 4/1980 | Meylan | | |
| 4,275,869 A * | 6/1981 | Clements | ............... | F15B 15/10 254/89 H |
| 4,372,533 A * | 2/1983 | Knaus | ............... | F15B 15/10 254/93 HP |
| 4,440,265 A * | 4/1984 | Spagnoli | ............... | B66F 7/04 182/129 |
| 4,470,578 A * | 9/1984 | Arvidsson | ............... | B65G 7/06 180/124 |
| 4,556,016 A * | 12/1985 | Snell | ............... | A01K 15/00 119/712 |
| 4,567,855 A * | 2/1986 | Snell | ............... | B66F 3/35 119/722 |
| 4,629,162 A * | 12/1986 | Porche | ............... | A61G 5/14 254/93 HP |
| 4,678,157 A * | 7/1987 | Fondiller | ............... | B28B 1/32 249/65 |
| 4,712,335 A * | 12/1987 | Barkdull, Jr. | ............... | E01D 1/00 14/24 |
| 4,746,471 A * | 5/1988 | Hale | ............... | E04G 11/04 249/65 |
| 4,865,096 A * | 9/1989 | Schober | ............... | B65D 88/16 220/666 |
| 4,875,548 A * | 10/1989 | Lorsbach | ............... | A62B 1/22 182/137 |
| 4,989,690 A * | 2/1991 | Mancosu | ............... | B64D 25/14 182/48 |
| 5,085,405 A * | 2/1992 | Vetter | ............... | B66F 3/35 254/93 HP |
| 5,119,907 A * | 6/1992 | Billington, III | ............... | B66F 11/04 182/113 |
| 5,131,503 A * | 7/1992 | Billington, III | ............... | B66F 11/04 182/113 |
| 5,400,999 A * | 3/1995 | Pavie | ............... | E04G 11/04 249/112 |
| 5,414,886 A * | 5/1995 | Sust | ............... | E01D 19/005 14/2.5 |
| 5,417,519 A * | 5/1995 | Smuts | ............... | E21D 5/12 249/152 |
| 5,426,896 A * | 6/1995 | Sloma | ............... | E02D 31/10 405/229 |
| 5,522,181 A * | 6/1996 | Ellsworth | ............... | E04B 1/169 135/904 |
| 5,529,293 A * | 6/1996 | Haugs | ............... | B63B 21/20 254/93 HP |
| 5,542,806 A * | 8/1996 | Kang | ............... | B66F 7/0633 187/273 |
| 5,668,421 A * | 9/1997 | Gladish | ............... | B60L 13/10 104/23.2 |
| 5,743,049 A * | 4/1998 | Thallemer | ............... | E04H 15/20 52/2.11 |
| 5,785,148 A * | 7/1998 | Wildner | ............... | B24C 3/065 182/138 |
| 5,931,248 A * | 8/1999 | Vickers | ............... | B60V 1/16 180/116 |
| 6,082,743 A * | 7/2000 | Black | ............... | B66F 3/35 248/188.2 |
| 6,176,113 B1 * | 1/2001 | White, III | ............... | B21D 1/06 72/54 |
| 6,199,827 B1 * | 3/2001 | Rimington | ............... | B66F 3/35 254/93 HP |
| 6,543,730 B2 * | 4/2003 | Pedretti | ............... | E04H 15/20 248/52 |
| 6,551,091 B1 * | 4/2003 | Bryant | ............... | B29C 43/3642 264/316 |
| 6,648,507 B2 * | 11/2003 | Joshi | ............... | B65D 88/1656 383/119 |
| 6,874,192 B2 * | 4/2005 | To | ............... | E01D 15/122 14/2.6 |
| 6,948,590 B1 * | 9/2005 | Hogeland | ............... | A62B 1/22 182/137 |
| 7,328,622 B2 * | 2/2008 | Foss | ............... | B64F 5/0045 254/93 HP |
| 7,770,508 B2 * | 8/2010 | Ferraresi | ............... | F15B 15/103 92/50 |
| 7,779,540 B2 | 8/2010 | McCaffrey et al. | | |
| 8,322,492 B1 * | 12/2012 | Balzano | ............... | A62B 1/22 182/129 |
| 8,413,960 B2 * | 4/2013 | Davis | ............... | F03D 1/005 254/93 HP |
| 9,056,755 B1 * | 6/2015 | Moy | ............... | B66F 3/24 |
| 2001/0048052 A1 * | 12/2001 | Illingworth | ............... | B64C 11/001 244/199.1 |
| 2004/0217338 A1 * | 11/2004 | Abrahamson | ............... | B66F 3/35 254/93 H |
| 2005/0132490 A1 * | 6/2005 | Davis | ............... | A61G 7/1021 5/81.1 R |
| 2006/0027276 A1 * | 2/2006 | Main | ............... | B66F 3/35 138/93 |
| 2008/0001130 A1 * | 1/2008 | Dibdin | ............... | B60P 1/02 254/93 HP |
| 2008/0011555 A1 * | 1/2008 | Ezechias | ............... | B66F 7/0633 187/269 |
| 2008/0116018 A1 * | 5/2008 | Wieland | ............... | A63G 31/12 187/401 |
| 2009/0032606 A1 * | 2/2009 | Hermann | ............... | B66F 3/35 238/14 |
| 2011/0133143 A1 * | 6/2011 | Bonus | ............... | B29D 22/02 254/93 HP |
| 2011/0162911 A1 * | 7/2011 | Wieland | ............... | A63G 31/10 182/141 |
| 2012/0038180 A1 * | 2/2012 | Steltz | ............... | B25J 15/0023 294/192 |
| 2014/0175259 A1 * | 6/2014 | Baum | ............... | E04G 11/28 249/22 |
| 2014/0270987 A1 * | 9/2014 | Williamson | ............... | E02D 17/08 405/282 |
| 2015/0132064 A1 * | 5/2015 | Pirtle | ............... | F16L 1/028 405/184.1 |

* cited by examiner

MAINTENANCE ASSEMBLY ADAPTABLE WITHIN GAS TURBINE ENGINE

CROSS-REFERENCE TO RELATED APPLICATIONS

This application claims priority to European application 13177623.9 filed Jul. 23, 2013, the contents of which are hereby incorporated in its entirety.

TECHNICAL FIELD

The present disclosure relates to maintenance activities of gas turbine engines, and, more particularly, to a maintenance assembly being arranged within a gas turbine engine for performing maintenance activities therewithin.

BACKGROUND

More often than not, in gas turbines, during closed conditions, it may be required for a worker to enter within a mid-section of an engine through a manhole for assembly, disassembly or timely and preventive maintenance to avoid any unnecessary breakdown or accidents, and to enable its effective and efficient working. For smaller gas turbines, it may be easy for workers to perform such activities, however, in case of larger gas turbines the workers may found quite difficult to perform such activities due to accessibility issues. In order to avoid such accessibility issues, conventionally, the workers may require carrying a set of unassembled components within the cavity of the engines from the manhole. Subsequently, such set of components are required to be assembled within the cavity of the gas turbine engine to form a suitable structure, such as a platform or scaffold etc., for enabling the workers to perform the maintenance activities within the gas turbine engine.

However, carrying such unassembled set of components within the engine's mid-section through the manhole, which are generally small in size, is quite a cumbersome task with potential Environment, Health and Safety (EHS) risks. Further, subsequent assembling of such set of components within the cavity to form the structure also adds to cumbersomeness, apart from long time in such assemblage.

Such conventional techniques may be quite in practice, and may have generally been considered satisfactory for their intended purposes, but may be unsatisfactory in terms of precluding risk of accidents and associated problems and huge time involved in carrying and assembling the structures every time the workers required to perform maintenance activities within the gas turbine engine.

Accordingly, there exists a need to preclude or minimize various such associated problems in an economical and adaptable manner.

SUMMARY

The present disclosure describes a maintenance assembly adaptable within a gas turbine engine, that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a maintenance assembly adaptable within gas turbine engines, which may be capable of precluding or minimizing risk of accidents, and associated problems and time involved in carrying and assembling structures every time workers required to perform various activities, such as maintenance, assembling or disassembling within the gas turbine engine. Another object of the present disclosure is to describe a maintenance assembly adaptable with gas turbine engine, which is convenient to use in an effective and economical way. Various other objects and features of the present disclosure will be apparent from the following detailed description and claims.

The above noted and other objects, in one aspect, may be achieved by a maintenance assembly adaptable within a gas turbine engine for workers to perform maintenance activities within the gas turbine engine. Specifically, the maintenance assembly is capable of being arranged within a cavity, generally around a combustor, accessible from a manhole of the gas turbine engine. The maintenance assembly includes a platform capable of carrying the workers; and an inflatable member cooperatively configured to the platform. The inflatable member at a normal condition, when placed outside of the cavity of the gas turbine engine, being at a deflated position. The inflatable member at a working condition, when arranged within the cavity of the gas turbine engine, being at inflated position so as to accommodate a shape coordinating the cavity in such a manner that the platform is advance within the cavity up to a predetermined level to enable the workers on the platform to reach at a predetermined position within the cavity to perform the maintenance activities within the gas turbine engine.

In one embodiment, the maintenance assembly 100 may include an inflating source adapted to be configured to the inflatable member to inflate the inflatable member.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and apparatuses are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "first," "second," "third" and the like, herein do not denote any order, elevation or importance, but rather are used to distinguish one element from another. Further, the terms "a" and "an" herein do not denote a limitation of quantity, but rather denote the presence of at least one of the referenced item.

Figure 1A:
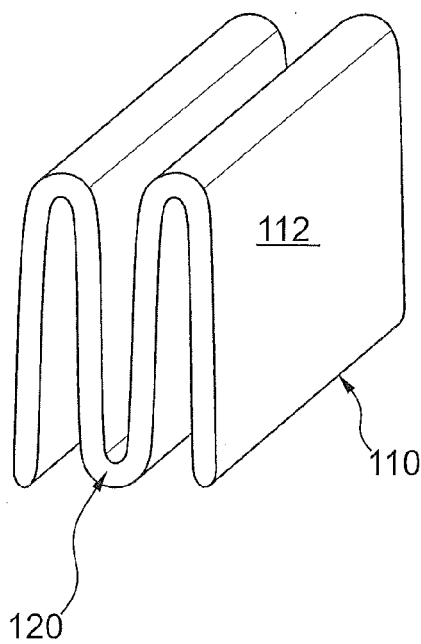
FIG. 1A illustrates an example of a maintenance assembly in a deflated position, outside of a gas turbine engine, in accordance with an exemplary embodiment of the present disclosure.
Figure 1B:
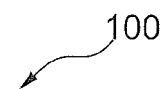
FIG. 1B illustrates an example of the maintenance assembly in an inflated position outside of a gas turbine engine, in accordance with an exemplary embodiment of the present disclosure.
Figure 2A:
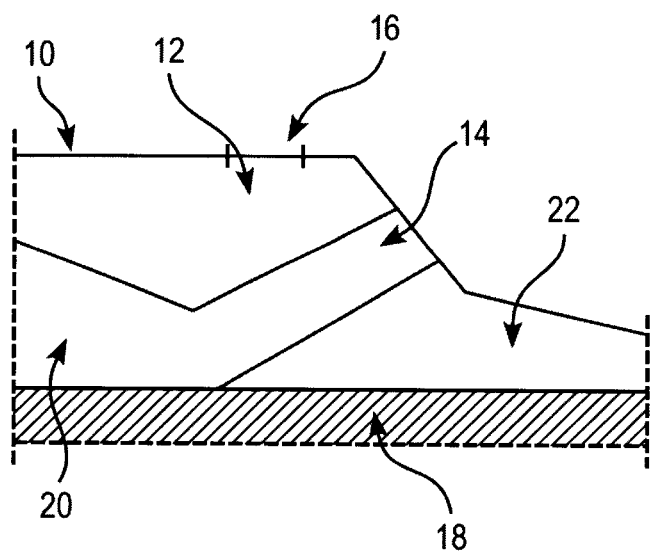
FIG. 2A illustrates a side view line representation of a gas turbine engine portion wherein the dashed lines represents the limits of the portion presented including a partial representation of the rotor 18.
Figure 2B:
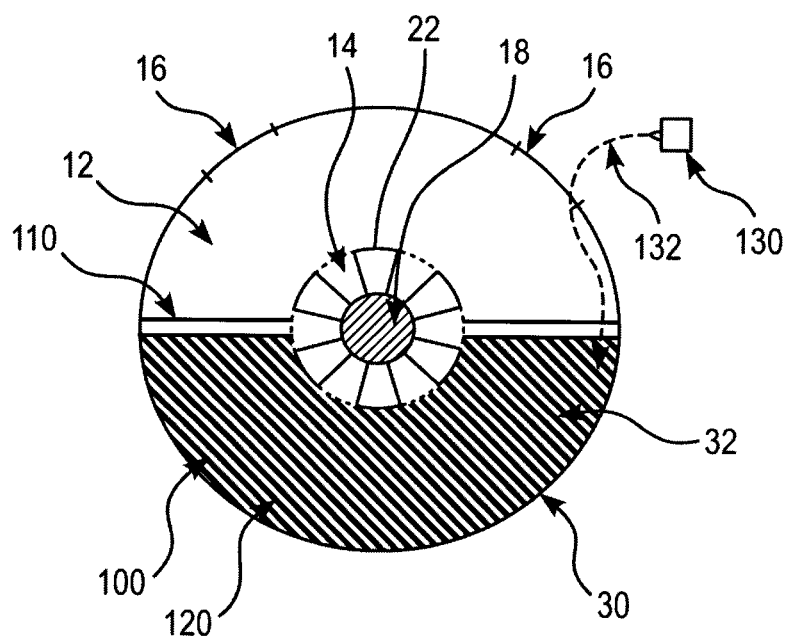
FIG. 2B illustrates a cross-sectional view of a gas turbine engine portion, depicting an example maintenance assembly in a working condition within the gas turbine engine portion at a shutdown condition, in accordance with an exemplary embodiment of the present disclosure.

Referring now to FIGS. 1A to 2B, examples of a maintenance assembly 100 configured to be adaptable within a gas turbine engine 10, are illustrated in accordance with an exemplary embodiment of the present disclosure. FIGS. 1A and 1B, respectively illustrate an example maintenance assembly in deflated and inflated positions outside of the gas turbine engine 10, and FIG. 2B, illustrates the maintenance assembly in combination with the gas turbine engine portion at a working condition. In as much as the construction and arrangement of the maintenance assembly 100, and the gas turbine engine 10 in which relation the maintenance assembly 100 are adaptable and used, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 1 to 2B, in the maintenance assembly 100, and the gas turbine engine 10 in which relation the maintenance assembly 100 are adaptable, only those components are shown that are relevant for the description of various embodiments of the present disclosure.

Referring now to FIGS. 1A, 1B, 2A and 2B, the maintenance assembly 100 includes a platform 110 and an inflatable member 120. The platform 110 and the inflatable member 120 are cooperatively configured to each other. In one example form, the inflatable member 120 is cooperatively configured below of the platform 110. In one embodiment of the present disclosure, the platform 110 may be a one-piece hard structure. In another embodiment, the platform 110 may be a hard splitable structure. Suitable examples of the one-piece or splitable hard surface structure of the platform 110 from which it may be made include, but not limiting to, woods, laminates etc. Further, the inflatable member 120 may be made of a suitable material that is capable of withstanding the pressure and holding medium that may be utilized to inflate thereto.

The maintenance assembly 100 is capable of being arranged within the gas turbine engine 10 at a shutdown condition for enabling workers to perform maintenance activities therewithin. The term maintenance activities includes, but not limiting to, various activities, such as assembly, disassembly or timely and preventive maintenance, that are required to be performed within the gas turbine engine 10 to avoid any unnecessary breakdown or accidents. Specifically, the gas turbine engine 10, as shown in FIGS. 2A and 2B, includes a cavity 12, generally around a combustor 14. The combustor 14 is shown around a rotor 18. Further, the gas turbine engine 10 is shown to include a typical arrangement depicting a turbine 20 and a compressor 22. The cavity 12 is accessible from a manhole 16 of the gas turbine engine 10 for providing the maintenance assembly 100 within the gas turbine engine 10 for enabling the workers to perform maintenance activities within the gas turbine engine.

A maintenance assembly 100 at a normal condition, as shown in FIG. 1 A, when placed outside of the cavity 12 of the gas turbine engine 10, is at a deflated position. When the workers need to perform the maintenance activities within the gas turbine engine 10, the maintenance assembly 100 is provided within the cavity 12 through manhole 16 and required to be inflated. An exemplary inflated maintenance assembly 100 outside of the cavity can be seen in FIG. 1 B. Once the maintenance assembly 100 is provided within the cavity, it is required to enable thereto to bring in a working condition. At the working condition, when arranged within the cavity 12 of the gas turbine engine 10, the inflatable member 120 is being inflated to adapt an inflated position. At the inflated position, as shown in FIG. 2B, the inflatable member 120 has a bottom wall 30 that accommodates a shape of the cavity 10 in such a manner that the platform 110 is advance within the cavity 12 up to a predetermined level to enable the workers on the platform 110 to reach at a predetermined position within the cavity 12 to perform the maintenance activities within the gas turbine engine 10. In an example, the platform 110 is adapted to be advanced up to the predetermined position, which may be at least up to a lower half position 32 of the cavity 12.

At the working condition, the platform 110 is adapted to be advanced by the inflatable member 120. Where the platform 110 is the hard splitable structure, it is adapted to be expended and advanced to form a flat and split surface 112 around the combustor 14 of the gas turbine engine 10.

Further, where the platform 110 is the one-piece structure, it is adapted to be expended and advanced below the combustor 14 level.

In an embodiment, the maintenance assembly 100 includes an inflating source 130 adapted to be configured to the inflatable member 120 to inflate the inflatable member 120. The inflating source 130 may be adapted to be disposed outside of the cavity 12. The inflating source 130 from the outside of the cavity 12 is fluidically connected, via a pipe 132, to inflate the inflatable member 120 within the cavity 12. The inflatable member 120 may incorporate a socket 122 to connect the pipe 132. In an example, the inflating source 130 may be a pump of suitable power to pneumatically or hydraulically inflate the inflating source 130. However, without departing form the scope of the present disclosure, the inflating source 130 may be deposed within the cavity 12 for inflating the inflatable member 120.

The maintenance assembly in combination with the gas turbine engine of the present disclosure is advantageous in various scopes. The maintenance assembly a compact and preassembled assembly which may be easily adaptable within the gas turbine engines. This precludes or minimizes the risk of accidents, and associated problems and time involved in carrying and assembling, as required in conventional structures, every time workers are required to perform various activities, such as maintenance, assembling or disassembling within the gas turbine engine. Further, adaptability of the maintenance assembly within the gas turbine engine makes the maintenance activities within the gas turbine engine convenient and effective in economical manner. Various other advantages and features of the present disclosure are apparent from the above detailed description and appendage claims.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A maintenance assembly configured for workers to perform maintenance activities within a gas turbine engine having a cavity, combustor, rotor and manhole, the maintenance assembly configured to be arranged within the cavity, generally around the combustor, and accessible from the manhole, the maintenance assembly comprising:
   a first platform and a second platform respectively configured to carry the workers;
   a u-shaped inflatable member configured to support the platforms, wherein the inflatable member has a first top-most surface and a second top-most surface, wherein the first platform is on the first top-most surface and the second platform is on the second top-most surface; and
   wherein the top-most surfaces are substantially parallel and completely separated from each other by the rotor when the inflatable member is inflated in the cavity; and wherein the inflatable member, when arranged within the cavity and inflated, has a bottom wall that matches a shape of the cavity in such a manner that the platforms are advanced upward into a horizontal position within the cavity up to a predetermined level to enable the workers to stand on the platforms to reach a predetermined position within the cavity to perform the maintenance activities within the gas turbine engine.

2. The maintenance assembly as claimed in claim 1, wherein the platforms are made of a wood material.

3. The maintenance assembly as claimed in claim 1, wherein the platforms are adapted to be advanced up to the predetermined position, which is at least up to a lower half position of the cavity.

4. The maintenance assembly as claimed in claim 1, wherein the inflatable member supports the platforms from below the platforms.

5. The maintenance assembly as claimed in claim 1, wherein the inflatable member when inflated is adapted to match a shape of the combustor of the gas turbine engine.

6. The maintenance assembly as claimed in claim 1 comprising:
   an inflating source configured to inflate the inflatable member.

7. The maintenance assembly as claimed in claim 6, wherein the inflating source is adapted to be disposed at an area outside of the cavity, the inflating source disposed at the area outside of the cavity is fluidically connected to inflate the inflatable member within the cavity.

8. The maintenance assembly as claimed in claim 6, wherein the inflating source is one of a pneumatic or hydraulic inflating source.

9. The maintenance assembly as claimed in claim 1, wherein the platforms are made of a laminate material.

10. The maintenance assembly as claimed in claim 1, wherein each of said platforms is a one-piece structure adapted to be advanced to a working position.

* * * * *